Sept. 6, 1960 A. G. BODINE 2,951,473
METHOD AND APPARATUS FOR SUPPRESSING ACOUSTIC DETONATION
PHENOMENA IN INTERNAL COMBUSTION ENGINES BY ION REACTION
Filed Aug. 5, 1957 5 Sheets-Sheet 3
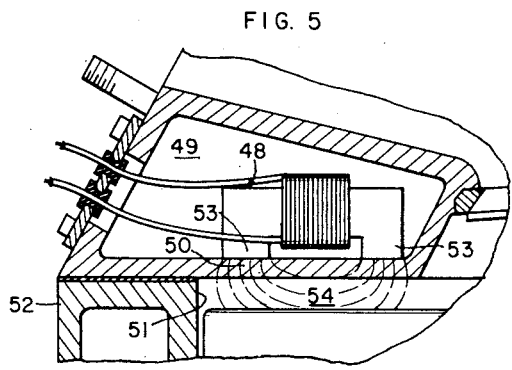
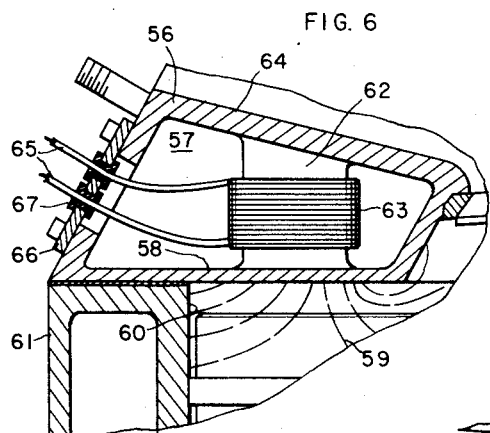
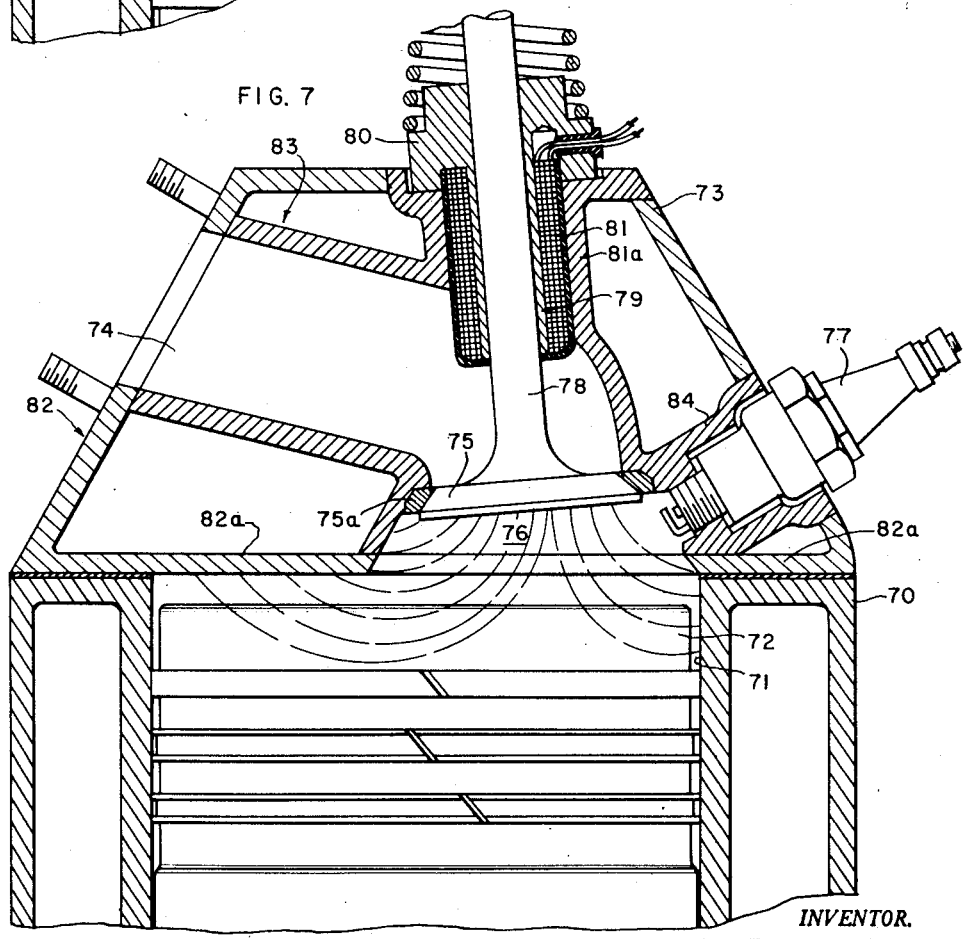
*INVENTOR.*
ALBERT G. BODINE
BY
ATTORNEY

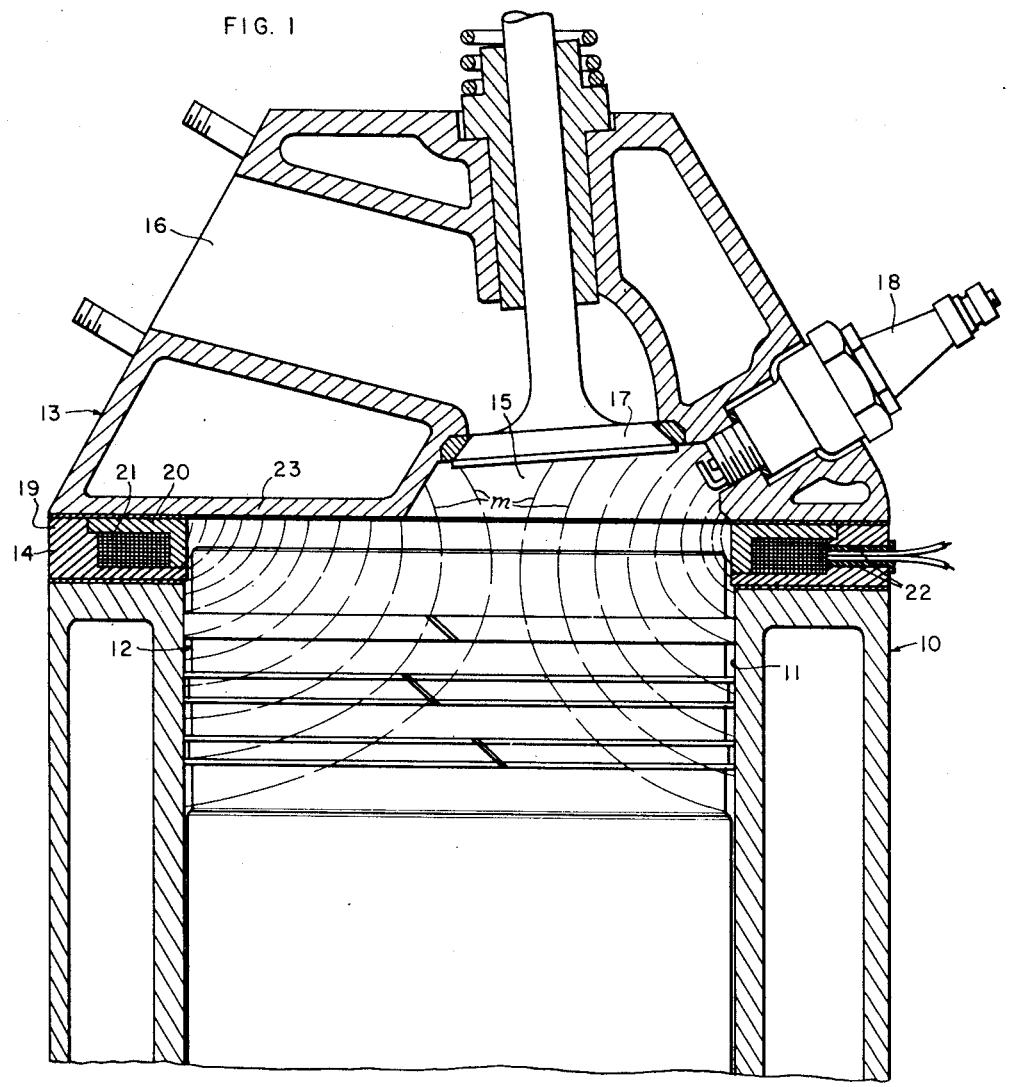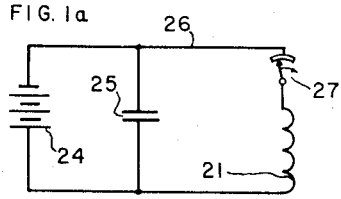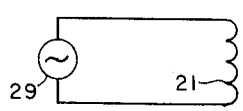

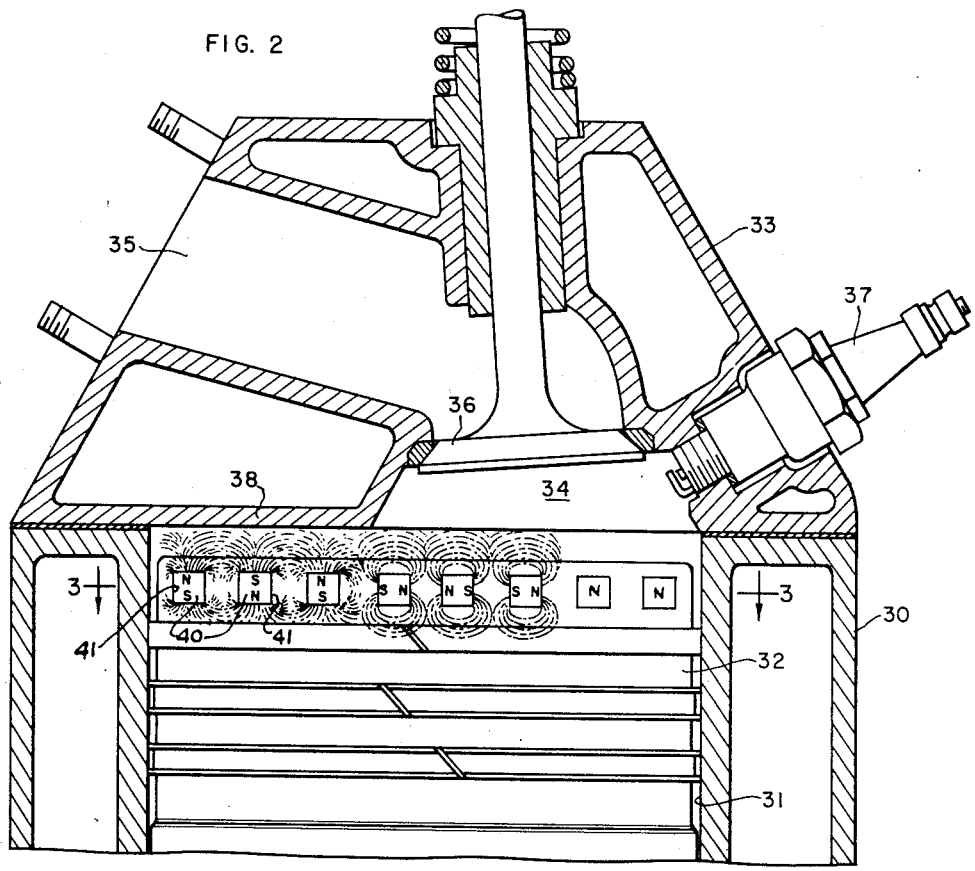
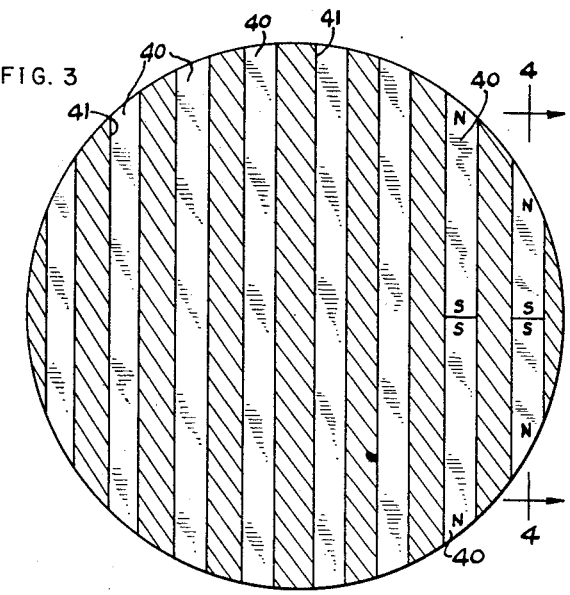
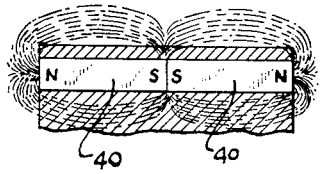
INVENTOR.
ALBERT G. BODINE
ATTORNEY

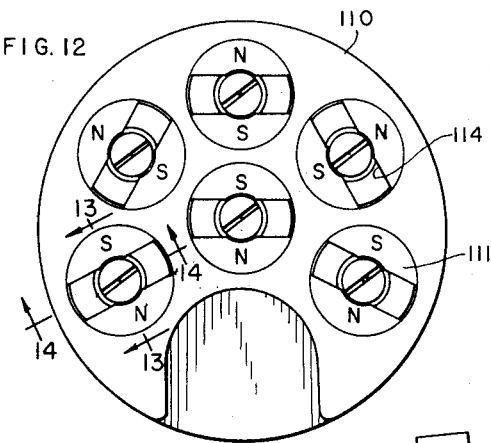
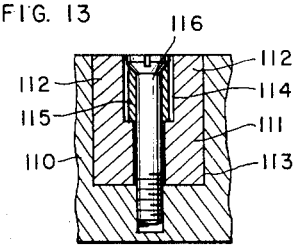
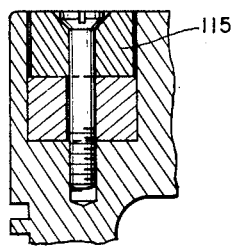
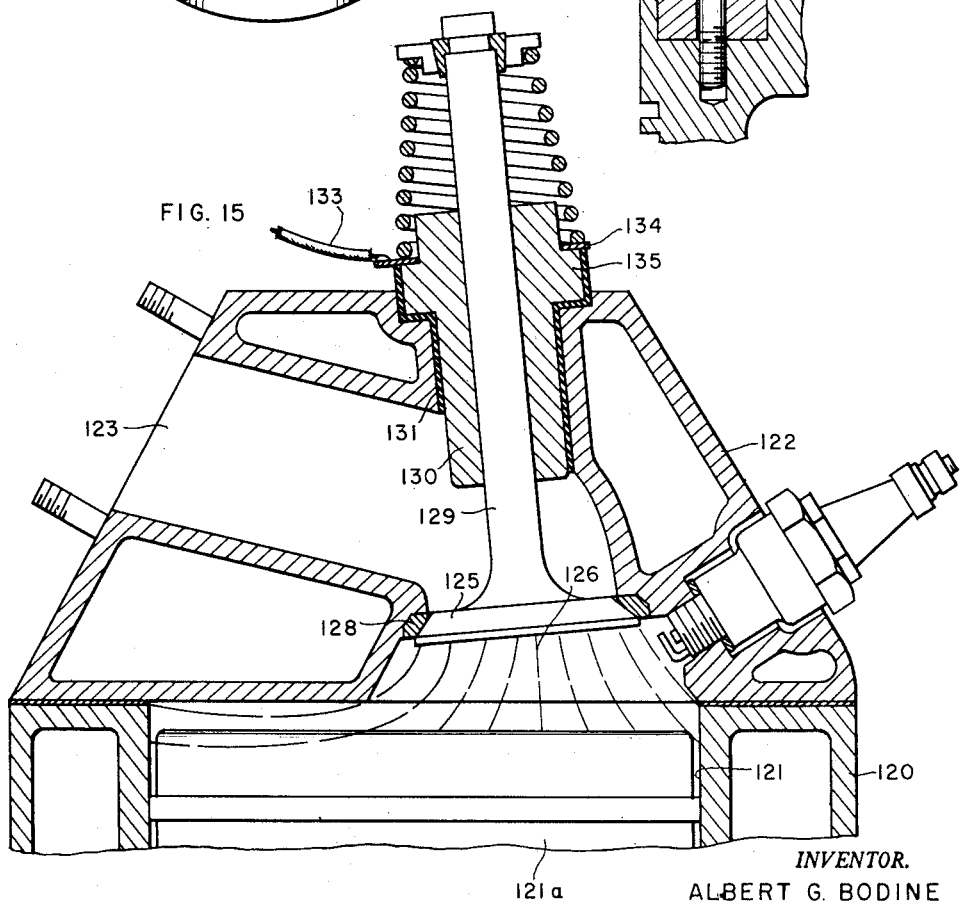

United States Patent Office 2,951,473
Patented Sept. 6, 1960

2,951,473

METHOD AND APPARATUS FOR SUPPRESSING ACOUSTIC DETONATION PHENOMENA IN INTERNAL COMBUSTION ENGINES BY ION REACTION

Albert G. Bodine, Van Nuys, Calif.
(13120 Moorpark St., Sherman Oaks, Calif.)

Filed Aug. 5, 1957, Ser. No. 676,102

15 Claims. (Cl. 123—191)

This invention relates generally to acoustic suppression of detonation in internal combustion engines such as piston engines, gas turbines, etc.

As set forth in my Patent No. 2,573,536, the phenomenon of detonation in engines is closely linked with acoustic phenomenon, sometimes involving high amplitude gas vibration patterns at resonant or near-resonant frequencies of the combustion chamber. See Figs. 1–4 of Patent No. 2,573,536, showing representative patterns. In some instances, detonation appears to involve a regenerative interaction between fluctuating acoustic and thermal energy, and in others it appears to involve shock excitation. In either case, the flame front "drives" a complex, high amplitude acoustic wave in the combustion chamber gases, which is harmful to performance, as well as to the engine structure, and is manifested by the familiar detonation knock. I have found that detonation can be ameliorated by suppressing the acoustic excitation and vibration of the combustion chamber gases. In brief, the invention contemplates the provision of an attenuative environment which suppresses the rate at which the flame front can drive the acoustic wave.

The present invention is based on my discovery that detonation in its several explained forms, can be suppressed by use of fields which act acoustically on ions present in the combustion chamber gases.

A primary object of the present invention is to suppress detonation in internal combustion engines by use of magnetic or electric fields acting to damp the motion and reduce the acoustic energy of ionized particles of vibrating combustion gases.

A further object is to provide such fields which will afford a suppressive or attenuative impedance for the energy content of the energy drive phase of the detonation acoustic waves; and a still further object is to provide, by such a field, an attenuative impedance for the ions and electrons in the thermal acoustic interaction wherein detonation acoustic waves are generated.

It is a known fact that heated combustion chamber gases are substantially ionized, containing a substantial concentration of positive ions, as well as free electrons. Negative ions may also occur, as a result of attachment of free electrons to neutral gas molecules. Accordingly, by the term "ion" I mean any electrically charged particle. I have found that a condition necessary for the occurrence of acoustic gas vibration characteristic of detonation is that these ions and electrons exist in a substantially free or unimpeded environment; and that by providing an attenuative or energy dissipative impedance for the acoustic activity of these ions and electrons, effective at the frequency of acoustic vibration, I can prevent or substantially reduce the action by which detonation waves are generated, and in general suppress the acoustic performance of the combustion chamber gases. Such an impedance I may create by establishing within the combustion chamber an electromagnetic field, or the magnetic component thereof, with the effect of influencing, deflecting, damping, and/or dissipating the energy of the ions and electrons of the acoustically vibrating gas. While a suitable magnetic field is comparatively easy to create inside the combustion chamber, an electric field, which possesses similar damping properties as regards the vibrating gas ions, may alternatively be used. The present invention contemplates broadly the use, within the combustion chamber, of such a field, presenting an energy dissipative impedance to acoustically vibrating gas ions at the frequencies at which detonation waves tend to occur, or for the gas particle motion which is the source of the frequency content of the detonation cycle or wave form to be combatted.

Two general aspects of the detonation mechanism and of the application of the present invention may be recognized. In the first of these, as set forth in connection with discussion of some of the embodiments in my aforementioned Patent No. 2,573,536, attention is confined to the resonant acoustic wave pattern created within the combustion chamber and to the acoustic gas vibration that takes place between the pressure antinode regions of such pattern, the vibration amplitude being maximized midway between the pressure antinodes, i.e., at the velocity antinode region therebetween. My prior application, entitled Detonation Suppression in Internal Combustion Engines by Attenuation of Acoustic Wave Patterns at Velocity Antinode, filed December 12, 1955, Ser. No. 552,314, now Patent No. 2,828,731, disclosed a detonation suppression system wherein a detonation suppressing impedance was introduced into the wave pattern at the velocity antinode region. The present invention contemplates, in its first aspect, the use, in the velocity antinode region, of an ion vibration damping field, e.g., magnetic, creating an energy dissipative impedance for the frequency content of the acoustic gas vibration occurring in that region. Thus, for example, I may run such a magnetic field through two boundary surfaces of the combustion chamber and through the combustion chamber space therebetween, the field being oriented within the chamber with a substantial component at right angles to the normal direction of acoustic gas vibration. The action may then be as follows: The gas ions present, owing to their motion in planes at right angles to the field, are subjected to a force which is both at right angles to the direction of acoustic vibratory action, and at right angles to the field, and this force deflects the ions alternately in opposite directions from their normal vibratory path as they travel under acoustic drive, first in one direction and then the other. The gas ions, propelled by the acoustic field, and subjected to the influence of the magnetic field, may thus describe elliptical or undulating paths which are the resultant of the acoustic motion and the deflection owing to the force of the magnetic field. The trend toward this elliptical motion is immediately dissipative of the acoustic gas vibrations. Thus, the ionized gas particles, forced to travel laterally as well as longitudinally of the normal vibration path, encounter and collide with a large number of un-ionized gas particles, and lose kinetic energy owing to such collisions, as well as creating frictional drag owing to their crosscurrent travel. In this connection, un-ionized as well as ionized gas particles participate in the acoustic vibration. Only the ionized gas particles, however, are laterally deflected by the magnetic field, and these particles therefore must travel with crosscurrent components of motion relative to the un-ionized particles. The result is that collision between ionized and un-ionized gas particles are multiplied a large number of times, and in general, a very considerable amount of energy is dissipated owing to both frictional drag and collisional effects of the crosscurrent travel of the gas ions. Moreover, the deflection of the ions from their normal acoustic wave pattern paths causes an elementary dissipation of energy over and above that owing to collision, in the process of transfer between kinetic energy and potential energy in the vibratory gas system. The energy of the gas vibration being thus dissipated, the amplitude of gas vibration is prevented from building up, and detonation "knock" is suppressed. It will be seen that an acoustic impedance effective to restrain free vibration of the gas particles has been set up by the magnetic field.

It has been mentioned above, and more fully described in my Patent No. 2,573,536, that detonation often appears in a regenerative process, linked with the thermal energy of the explosion. In this process, thermal energy of combustion undergoes a fluctuation which triggers or drives gas vibration, sometimes at a resonant frequency of the combustion chamber. This gas vibration then reacts regeneratively on the combustion fluctuation, and both the combustion fluctuation and the acoustic gas vibration thus build up regeneratively to high amplitudes. The regular dissipation of energy, owing to the presence and influence of the magnetic field and the dissipative impedance offered thereby, prevents this regenerative buildup of interlinked high amplitude acoustic and thermal performances, with the consequence that this form of detonation is strongly suppressed.

A further aspect of the invention deals with phenomena in the region of the pressure antinodes. It is a known fact that fuel combustion in an engine is fluctuating or nonsteady in character. That is to say, during the burning of a charge of fuel, the combustion intensity and pressure fluctuate at a fairly high frequency or exhibit very rapid changes in rate. In order for a sustained detonation wave pattern to occur, the combustion fluctuation frequency content must be high enough in some portion or portions of the flame front to approximate resonant acoustic combustion chamber frequencies. Also, the steep-fronted shock type transient detonation wave involves sudden change in combustion rate and gas particle motion, and has a large frequency content or frequency pattern, but not necessarily related to resonant frequencies of the combustion chamber. The term "acoustic pattern" is thus intended to include frequency patterns as well as spatial patterns. Combustion pressure fluctuation at the resonant frequency of the combustion chamber, or with a frequency content such as to create a steep-fronted shock-type wave, acts at the pressure antinode regions of the combustion chamber to drive the acoustic gas vibration cycle, causing either or both of the two mentioned forms of detonation. It will be seen that the detonation process requires a high vibrational or translatory activity of the ions at the pressure antinodes, this following from the fact that damped ions have a drag effect on surrounding un-ionized gas particles. Accordingly, application of an ion damping field at the pressure antinode reduces the drive of the acoustic vibrations by combustion fluctuation. With particular reference to the sustained type of detonation wave pattern, I apply a field which reduces the activity of the ions or electrons by providing a dissipative or attenuative impedance effective for the reaction time interval which occurs during the energy drive phase of the acoustic wave. With reference to the shock type of detonation wave, an attenuative impedance is provided which is effective for the frequency content of the gas particle motion of each acoustic wave pulse. In general, it may be said that a field is used which has an attenuative or suppressive impedance for the wave shape or frequency realm of acoustic engine detonation phenomena. The acoustically vibrating ions and electrons are thus subjected to a restraining field, effective at this acoustic vibration frequency, such that the combustion gases do not exist in a free environment while tending to generate acoustic vibration waves.

Whereas, my basic concept of suppressing detonation, as disclosed in my Patent No. 2,573,536, and others following, stemmed from my discovery of a remarkable and unsuspected relationship between combustion and acoustic waves, the present invention stems from an even more remarkable and unsuspected discovery that electromagnetic field phenomena can be utilized to create an attenuative or energy dissipative impedance for gas vibration at detonation frequencies.

It will be understood that I use the expressions, electromagnetic field, or electromagnetic waves or radiation in their proper technical sense to denote a field or radiation composed of magnetic and/or electric components; and it is to be further understood that, although the magnetic component is generally preferred at present, the electric component, which possesses a generally similar ion damping property, may also be used. The three-way interaction of engine detonation, acoustic wave action in the combustion gases, and an electromagnetic field, as taught herein, is completely unique, as well as of surprising effect on detonation.

For the purpose of a broad description of a preferred practice of the invention, it is sufficient to say that I have discovered, through controlled laboratory testing, that a magnetic field, arranged in the combustion chamber region in which acoustic gas vibration occurs during detonation, can present or bring about a very effective attenuative action, or dissipative impedance, as regards gas vibration at detonation frequencies. A certain latitude of adjustment in the field parameter is possible within the area of the invention. That is to say, in any combination of field strength, polarity, concentration, gradient, location and geometric orientation within a specific combustion chamber, the field must be so adjusted relative to the remaining factors that it presents or causes a material attenuative impedance at detonation frequencies. Since such impedance is the result of a combination of variable factors, no one factor, in general, can be spelled out quantitatively. However, one specific example will be given hereinafter; and from the teachings set forth, those skilled in the art can provide a field presenting the necessary attenuative effect for the detonation frequencies involved.

As will be observed from experience, incidental fields, field distributions unrelated to the acoustic patterns, or stray flux from other types of electrical apparatus or magnetic conditions around or in engines do not produce noted effect of acoustic detonation suppression, and hence are not within the province of this discussion.

It is an object of the invention to provide a method of and means for detonation suppression that is effective on both regenerative detonation sound wave phenomena, and shock or transient acoustic waves or pulses in detonation.

It is a further object to effect detonation suppression by employing electromagnetic field phenomena, magnetic or electric, so as to provide an attenuative or suppressive impedance for the acoustic wave, wave shape, or wave frequency content, that is present in the acoustic performance forming a part of engine detonation.

The "impedance" to acoustic detonation waves presented or caused by the electromagnetic field, as used in the present invention, is not to be thought of as the impedance of the electromagnetic field, but as an analogous or equivalent impedance, akin to acoustic impedance, which has an energy dissipative effect on the acoustic phenomena involved in detonation. The impedance spoken of is of course resistive or dissipative, rather than reactive. It is, in effect, an acoustic impedance such as relates to an acoustic wave pattern in the combustion chamber, or the equivalent to acoustic impedance as regards gas particle motion at any point therein, including the source region of an acoustic gas vibration pattern.

Essentially, and broadly, it is to be understood that the field used creates a condition or environment in which acoustically vibrating ionized gas particles encounter a highly attenuative impedance. It will thus be seen that the invention involves the use of a field which produces an impedance for vibratory ionized gas particles at the frequencies of detonation. I have attained success using a magnetic field. I may, however, use either the magnetic field, or any related field which creates such an impedance to vibratory ionized gas particles.

The invention contemplates the passing of a magnetic field through the combustion chamber where acoustic detonation phenomena occurs, and contemplates that this field be passed through the velocity antinodes of the wave pattern to suppress generated wave patterns, and through the pressure antinodes (high impedance regions) of the pattern to suppress generation of the wave patterns.

A further feature of the invention consists in varying the field strength during the combustion time. For example, assuming use of a field about an electromagnet, the electromagnet may be energized at about the beginning of the detonation time interval, and de-energized at the termination thereof. By thus reducing the time duration of magnet energization to the detonation portion of the engine cycle, drain on the electric power supply source is materially reduced. In addition, however, the alternately growing and collapsing magnetic fields, cutting the travel paths of the vibrating gas ions, create electric fields with components of direction along such travel paths, and hence cause movements of the ions therealong in directions and time phase which, in general, will be at variance with those of the prevailing acoustic wave pattern. The motion of the acoustically vibrating gas particles is thus bucked and impeded by virtue of the varying magnetic field. Similar effects are obtained by use of permanent magnets mounted on the piston; as the piston moves, the magnetic fields of the magnets cut the acoustic ion paths, and interfere with or impede the acoustic vibratory motion.

It appears that the invention is especially effective in cases wherein the fuel contains additives, such as lead, or boron, for example.

The invention will be more fully understood from the following detailed description of a number of selected illustrative embodiments thereof, reference for this purpose being had to the accompanying drawings, in which:

Fig. 1 is a somewhat diagrammatic vertical sectional view through an engine cylinder block and head, showing a form of the invention incorporated therein;

Fig. 1a is a diagram showing an energizing circuit for an electromagnet, which may be used in connection with the embodiment of Fig. 1;

Fig. 1b is a diagram similar to Fig. 1a, showing a modification;

Fig. 2 is a view similar to Fig. 1, but showing a modification;

Fig. 3 is a section through the piston of the engine of Fig. 2, taken on line 3—3 of Fig. 2;

Fig. 4 is a detailed section taken on line 4—4 of Fig. 3;

Fig. 5 shows a fragmentary portion of an engine cylinder block and head, similar to that of Fig. 2, and showing a modification of the invention;

Fig. 6 is a view similar to Fig. 5, but showing a further modification;

Fig. 7 is a view similar to Fig. 2, but showing a further modification of the invention;

Fig. 12 is a plan view of a piston showing a modified arrangement of magnets mounted therein;

Fig. 13 is a detailed section taken on line 13—13 of Fig. 12;

Fig. 14 is a detailed section taken on line 14—14 of Fig. 12; and

Fig. 15 shows somewhat diagrammatically another cylinder and head block incorporating a modification of the invention.

Figure 8:
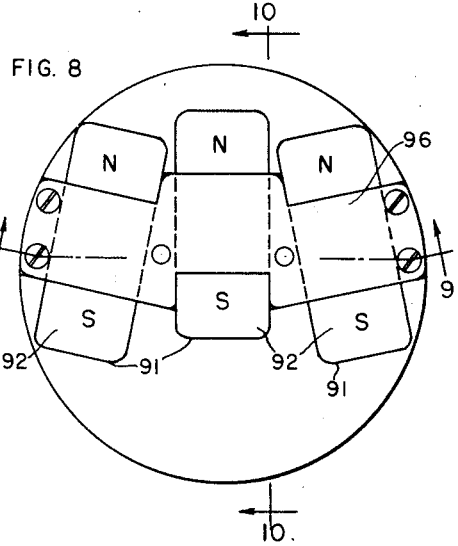
Fig. 8 is a plan view of a piston incorporating another form of the invention.

With reference first to Fig. 1 of the drawings, numeral 10 designates a water-cooled engine cylinder block, having cylinder bore 11 in which works piston 12 (shown part way down beyond top dead center). Numeral 13 designates a water-cooled head, mounted on block 10 through thick, hollow spacer gasket 14. Head 13 provides somewhat offset valve pocket and combustion chamber space 15, and has intake port 16, intake valve 17, and corresponding exhaust port and exhaust valve, not shown, communicating with space 15. Spark plug 18 communicates with the combustion chamber space 15, as shown.

The gasket 14 is made of two interfitting annuli 19 and 20, between and inside which is a magnet coil 21. The inside annulus 20 is made of some nonmagnetic material, such as aluminum. To the terminals of coil 21 are connected leads 22 which lead to a suitable source of electric power, as described hereinafter.

When the coil is energized, a magnetic field, as indicated by the dash lines $m$ in the drawing, is created, and this field curves upwardly through the entire combustion space, the space 15, and the space also between the head wall 23 and the top of the piston. As shown in Fig. 1, the piston is assumed to be made of aluminum, i.e., some nonferric alloy, so that its presence does not materially affect the concentration and distribution of the magnetic flux. I may alternatively use a ferric-alloy piston, in which case the flux path will be concentrated and modified by the piston in an obvious way.

In the operation of such an engine, as fully set forth in my Patent No. 2,578,536, and illustrated in Figs. 1–4 thereof, the onset of detonation is accompanied by, or involves, the generation of various acoustic wave patterns, some of which are resonant, and many, if not most or all of which, take place with substantial components of vibration in planes generally transverse to the cylinder. These components of vibration are accordingly substantially at right angles to the direction of the magnetic field $m$. Hence any ionized gas molecules participating in this vibration are subjected to an electromagnetic force which has a substantial component at right angles both to the magnetic field and to the direction of acoustic vibration. It is of course commonly known that engine combustion gases contain a substantial proportion of gas ions. It might also be noted at this point that the typical detonation suppression effect characteristic of the invention occurs especially when combustion takes place with a chain reaction of the type that exists under high compression in cylinder, where a sequence of ionized gas particles is produced. The un-ionized vibrating gas molecules are not influenced by the magnetic field. Vibrating ionized gas molecules, however, are relatively deflected by the magnetic field, and therefore forced to travel crosscurrent of the vibrating un-ionized gas molecules. While all factors involved are not yet sufficiently known or clear that I can be certain of a final theory, under the conditions described, engine knock is very substantially suppressed. It is clear that an attenuative impedance has been set up to acoustic vibration of the ionized gas particles. Apparently, the deflected ions collide with undeflected un-ionized gas particles, causing turbulence, frictional drag, loss of energy, and general attenuation of the acoustic wave pattern. In addition, the substantial proportion of laterally deflected vibrating gas ions distorts the normal acoustic gas vibration pattern, and results in the vibrating gas ions departing so far from their normal acoustic pattern paths that their ability to maintain the acoustic pattern is seriously impaired. Thus, the vibrating gas ions are forced into circuitous routes, tend to terminate their successive vibratory movements off the path of the normal wave pattern, tend to travel in loops or swirls, and, in general to cause extreme distortion of the normal wave ptatern. As a consequence, the vibrating gas ions fail to tranfer their kinetic energy to a like amount of potential energy at the pressure antinodes of the normal wave pattern, and the distorted acoustic pattern is greatly attenuated as compared with the original undistorted condition.

The source of power for the magnet coil leads 22 may be a suitable battery. In Fig. 1a, however, I show a fairly high voltage battery 24 arranged to charge a condenser 25, and a circuit 26 in shunt with the latter containing coil 21 and an engine driven timer 27. This timer closes circuit 26 during the detonation interval of the engine cycle, which may extend, for instance, from shortly in advance of top dead center to a time after top dead center. The condenser, previously charged by the battery, thus discharges during the detonation phase of the cycle, energizing the coil, and so creating the magnetic field that suppresses the acoustic ion vibrations. The condenser and coil combination may, if desired, be designed to have a sufficiently long time constant that the voltage thereof will not fall materially during the detonation interval. However, the coil when connected to the charged condenser will build up a magnetic field, and this field, of course, decays over a definite time period, depending upon the time constant of the coil. It will be seen that upon closure of the liner contacts, the condenser suddenly applies a voltage across coil 22, which voltage then decays exponentially. The current flow through the coil, and the magnetic field around the coil, rise to a maximum, and then decay. The timer may be adjusted to close the circuit prior to the detonation interval, so that a full magnetic field exists at the inception of detonation; or to close the circuit so that the magnetic field rises during the early part of the detonation interval. Further, the time constant of the coil may be made such that the magnetic field collapses during the latter stages of the detonation interval. The expanding and collapsing magnetic fields generate electric fields with components in the direction of the acoustic ion vibration paths, and along which potential differences exist which cause ion flows which, in general, differ from the ion motion owing to the acoustic pattern, and hence interfere with, impede, or buck the latter. Rising and falling magnetic fields thus create opposition to the acoustic gas vibration patterns, and are attenuative thereof.

In Fig. 1b I have shown a modified system for energizing the magnet coil 21, involving in this case a means for periodically fluctuating the field created by the magnet by fluctuating its energization. In this specific case, the magnet coil may be energized by a generator 29, which may be either D.C. or A.C., so that the field is either sinusoidally varied, or reversed, as the case may be. A timer, such as used in the circuit of Fig. 1a, may be used in similar fashion in the circuit of Fig. 1b, if desired. Such field variations or reversals have a restraining influence on ion vibration in the acoustic pattern paths, for reasons analogous to those explained above.

It will further be seen that, if a ferric alloy piston be used in the system of Fig. 1, the field will be periodically fluctuated by the motion of the piston. Thus, at the upper end of the stroke a large part of the flux will pass to and through the piston, while as the piston descends, the amount of the flux will weaken, causing certain flux variations. Such variations are also effective to reduce acoustic ion vibration, as explained above.

Figs. 2 and 3 show a modified form of the invention, wherein a magnetic field is produced by means of permanent bar magnets set into the upper end portion of a nonmagnetic piston. The system in this case involves multiple and movable magnetic poles creating fields in the combustion chamber. The engine includes cylinder block 30 having cylinder bore 31 in which works piston 32 composed of a nonferric material. On block 30 is head 33, formed with a modern, somewhat conventional offset valve pocket 34 forming the main part of the combustion chamber when the piston is at top dead center. In the drawing, the piston is shown in a position well beyond top dead center. Head 33 has intake port 35, intake valve 36, and corresponding exhaust port and exhaust valve, not shown. A spark plug is shown at 37.

A plurality of permanent bar magnets 40 are mounted in long apertures 41 formed in the upper end of the piston, in positions to create magnetic fields in the narrow gap between the top of the piston and head wall 38, and in the combustion pocket 34. At top dead center, the piston may make a very close approach to the head wall 38. I have found that most of the detonation occurs in this narrow region between the piston and the head wall, somewhat remote from the spark plug. The magnetic fields of the bar magnets 40 fill this narrow gap, and are highly effective on the acoustic gas vibration patterns therein.

The magnets may be arranged in various physical patterns, such as parallel, radial with respect to the piston, or otherwise, and with various modes of magnetization. They have here been shown in a parallel arrangement. The magnets at the left, as seen in Figs. 2 and 3, are transversely magnetized, and disposed alternately with north and south poles uppermost. The magnets in the center region of the figure are similarly magnetized, but arranged with like poles facing one another. The magnets at the right (see also Fig. 4) are longitudinally magnetized. Preferably, they are arranged in end-to-end pairs, with like poles adjacent one another. Laterally adjacent magnets are also arranged with like poles opposed to one another. All these configurations fill the combustion chamber space, particularly the narrow gap between the piston and the wall 38, with a strong magnetic field, which field has components at right angles to directions of acoustic gas pattern vibrations, so as to be effective to exert a deflecting and damping thrust on gas ions attempting to participate in such gas pattern vibration. Moreover, as the piston descends beyond top dead center, the field of the magnets cuts the ion vibration patterns, setting up ion flow paths at variance with the acoustic ion vibration paths, and so hindering and attenuating the latter.

Fig. 5 shows a fragmentary portion of an engine of the general type of Fig. 2, wherein an electromagnet 48 is installed in the water jacket 49 directly over the head wall 50 above the cylinder bore 51 in block 52. The core of the electromagnet 48 is in the general form of a yoke, opposite end portions or pole pieces 53 of which are positioned over the combustion chamber space 54, so as to provide a magnetic field which passes through the combustion chamber gasses above the piston. Combustion chamber head wall 50 may either be thin, so as to provide an inadequate path for the magnetic flux, or the head may be composed of aluminum. It is, of course, essential that the field from the electromagnet penetrate the wall 50 and pass through the combustion chamber area 54. Operation with the embodiment of Fig. 5 is in general similar to that described in connection with Fig. 1.

Fig. 6, which is a view similar to Fig. 5, shows another manner of obtaining a magnetic field in the combustion chamber through use of an electromagnet installed in the water jacket of the cylinder head. In Fig. 6, cylinder head 56 has water jacket 57, and has a relatively thin head wall 58 over the combustion chamber space 59 above cylinder bore 60 of cylinder block 61. A thick magnetic core 62 of an electromagnet 63 extends vertically in water jacket 57, terminating at the bottom at head wall 58, and at the top of wall 64. The coil of the electromagnet has leads 65 connected to a suitable source of electric power and led out through a removable plate 66 via water sealing grommets 67. In this case, the flux path for the electromagnet is furnished largely by the water jacket defining walls; but the lower or head wall 58 is made sufficiently thin that, even though a part of the flux will travel therethrough, a substantial part penetrates therebeyond and passes through the combustion chamber space 59, as indicated.

Fig. 7 shows a further engine, of general similar type to those described heretofore, equipped with another modified form of the invention. Block 70 has cylinder bore 71 containing piston 72, and mounted on block 70 is head 73 having intake port 74, intake valve 75, seating on nonmagnetic valve seat 75a, and opening to offset valve pocket 76, which forms a major portion of the combustion chamber space. An exhaust port and exhaust valve, not shown, will be understood to be positioned alongside port 74 and valve 75, so as to lead from the combustion chamber pocket 76. Spark plug 77 mounted in head 73 communicates with pocket 76, as shown.

Valve 75 is on a valve stem 78 passing through a valve guide sleeve 79 projecting from a sleeve head 80 seated on cylinder head 73, as shown, and fitted on guide sleeve 79 is an electromagnet coil 81. The head 73 is made up of two integrally joined castings, an outer housing 82, and an inner nonmagnetic core part 83, composed, for example, of aluminum. The core part comprises the intake port tube 74, the tubular coil embracing wall 81a, and the tubular spark plug supporting wall 84. Magnetic flux owing to the coil 81 is set up in the valve stem and valve 75, and passes from the latter, through the combustion chamber to the wall 82a, as shown. The outside cylinder head casting structure 82, together with a portion of the cylinder head casting 70, constitutes the magnetic return path for the coil 81, as will be evident.

Figure 11:
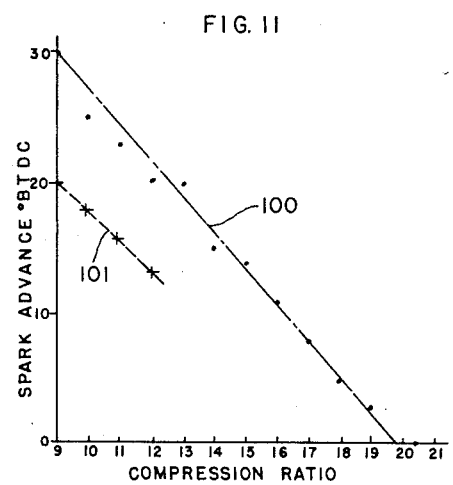
Fig. 11 is a performance graph obtained with the piston of Figs. 8 and 9.
Figure 9:
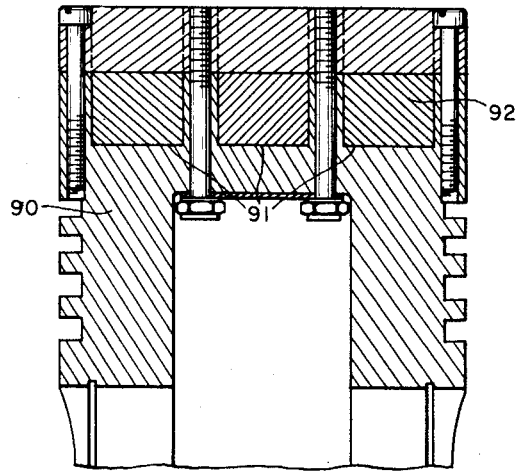
Fig. 9 is a section taken on line 9—9 of Fig. 8.
Figure 10:
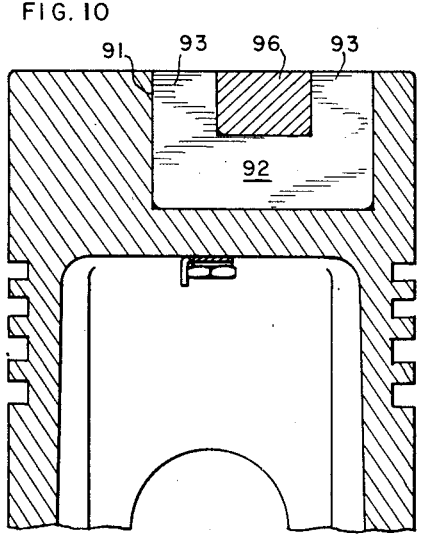
Fig. 10 is a section taken on line 10—10 of Fig. 8.

In Figs. 8–10 I show a piston carrying permanent magnet inserts, which I have used in a standard CFR test engine, and which has given detonation suppression results as diagrammed in the chart of Fig. 11. The CFR engine with which the piston of Figs. 8–10 is used is so well known to those skilled in the art that no illustration thereof is deemed necessary herein. The piston, designated generally by numeral 90, is slotted at the top for a set of three yoke-shaped or channelled permanent magnets 92. The opposite end portions 93 of the yokes constitute the pole pieces of the magnet, and project upwardly, terminating flush with the top of the piston, as shown clearly in Fig. 10. The magnets are oriented to create magnetic fields which will pass through the combustion chamber space in the engine above the piston along direction lines transverse of the acoustic gas vibration paths. In the example of Figs. 8–10, one magnet extends along a diameter of the piston, and is offset somewhat with respect to the vertical center axis of the piston, while the other two magnets are placed in flanking positions, at angles of approximately 12° to the first mentioned magnet, all as clearly shown in Fig. 8. To complete the assembly, a strap 96 engages the three magnets between the pole pieces 93 thereof, being secured in position by any suitable fastening means, such as represented in the drawing.

To give a specific example, magnets 92 used in the embodiment of Figs. 8–10 were 1.75" in length, with remaining dimensions to scale. These were used in a 3.2" diameter piston, in the arrangement shown in Fig. 8. The magnets were composed of Alnico-V, and had a remanence of 12,500 gausses.

Fig. 10 is a graph plotting experimental data obtained by an independent research group testing the piston of Figs. 8–10 in a standard CFR engine, running 1800 r.p.m., and using 80 octane gasoline. The chart of Fig. 10 plots spark advance against compression ratio, it being understood that the CFR engine is equipped with means for varying compression ratio to facilitate such tests as the present. The procedure involved in the test was to operate the engine in progressively increasing compression ratios and for each setting of compression ratio, to advance the spark as far as possible without bringing on detonation knock. Curve 100 in Fig. 10 was obtained with the piston of Figs. 8–10 with the magnets fully magnetized, while curve 101 was obtained under exactly similar circumstances, with the sole exception that the magnets were completely demagnetized. Regarding curve 100, it is noted that the engine performed throughout a range of from nine to one compression ratio at 30 degrees spark advance, to approximately twenty to one compression ratio at zero degrees spark advance, without exhibiting detonation knock. With the magnets demagnetized, as represented by curve 101, the range obtained was from nine to one compression ratio at a spark advance of 20 degrees, to a compression ratio of 12 to one, with a spark advance of approximately 12 degrees. The engine, with the demagnetized magnets, would not run above a compression ratio of 12 to one for any spark setting without knock.

Figs. 12–14 show an alternative form of piston mounted permanent magnet, and an alternative arrangement of a set of such magnets in the piston top. The piston is designated generally at 110, and a plurality of permanent magnets, here six in number, are designated by the numeral 111. The magnets 111 are in the form of slotted cylinders, forming yokes with upwardly extending pole pieces 112, the magnets being mounted in bores 113 extending downwardly into the top of the piston, and the pole pieces 112 terminating flush with the upper surface of the piston. The transverse slots 114 formed in the magnets receive filler blocks 115, which are bored to receive hold-down screws 116 threaded into the piston. The magnets may be arranged in a number of patterns, although that illustrated in Fig. 11 provides magnetic fields effective in the combustion chamber space of a CFR type engine. These magnets had a remanence of about 10,000 gausses.

Fig. 15 shows an engine equipped with means by which an effective electric field may be used instead of the magnetic field of earlier embodiments. The engine again has cylinder block 120 formed with cylinder bore 121, in which works piston 121a, and mounted on block 120 is cylinder head 122 having intake port 123 controlled by intake valve 125 leading to valve pocket 126 which formed a major portion of the combustion chamber space at top dead center. A similar exhaust port and exhaust valve, not shown, will be understood to be provided alongside the intake port and intake valve. The valve 125 seats on nonconductive valve seat 128, composed, typically, of a sintered oxide material. The block 120 and head 122 are preferably composed of iron.

Valve 125 is on a stem 129 working in a phenolic or other insulation guide bushing 130 mounted in head 122. Before pressing the bushing 130 into the cylinder head, it has applied thereto a substantial sealing coating 131. An electrical connection may be made to valve stem 129 from lead 133 connected to washer 134 engaging flange 135 on valve guide 130, and through valve spring 136 and seat 137 to the stem 129. A source of suitable high voltage is connected at one terminal to lead 133 and at the other is grounded to the engine block.

Two cases are possible: the piston may be composed of relatively nonconductive material, or of a relatively conductive material, such as aluminum. Assuming the former case, an electric field such as is indicated at $e$ is provided in the combustion chamber space. A part of this field may terminate on the piston, and a part on the walls of the combustion chamber. Assuming the case of a conductive piston, and the piston to have a good conductive path to the engine block battery terminal, more of the field will terminate on the top of the piston. In either case, an electric field intersects the acoustic gas vibration patterns and deflects the ionized particles of the gas. Positively charged ions may be attracted to either the valve 125, or to the piston and/or combustion chamber and cylinder bore walls, depending upon polarities; and it is within the scope of my invention to connect either the positive or negative terminal of the source of electric power to the valve. The electric field will thus deflect the ionized gas particles attempting to participate in the acoustic gas vibration patterns, and hence, like the magnetic field, will exert a damping or attenuative effect on the acoustic gas patterns. In effect, an impedance is again introduced to the acoustic gas vibration.

It will be understood that the drawings and descriptions are merely illustrative of numerous ways in which the broad invention may be carried into effect, and that corresponding changes in design, structure and arrangement may be made without departing from the spirit and scope of the appended claims.

I claim:

1. The method of suppressing detonation of fuel and air mixtures during burning under high compression in the combustion chamber of an internal combustion engine, that includes: acoustically attenuating sound waves occurring in an acoustic pattern in the gas filled combustion chamber at a sound wave frequency at which detonation tends to occur by producing in the region of such acoustic pattern within the combustion chamber, during the combustion phase of the engine cycle, an electro-magnetic field, and maintaining said field during said combustion phase at a strength which provides an attenuative response for the frequency of said sound waves.

2. The method of suppressing detonation of fuel and air mixtures during burning under high compression in the combustion chamber of an internal combustion engine, that includes: acoustically attenuating sound waves occurring in an acoustic pattern in the gas filled combustion chamber at a sound wave frequency at which detonation tends to occur by producing a magnetic field within the combustion chamber in the region of such acoustic pattern during the combustion phase of the engine cycle, and maintaining said field during said combustion phase at a strength which provides an attenuative response for the frequency of said sound waves.

3. The method of suppressing detonation of fuel and air mixtures during burning under high compression in the combustion chamber of an internal combustion engine, that includes: attenuating an acoustic gas vibration pattern occurring in the combustion chamber during detonation by passing through said pattern a magnetic field having a component whose direction is at substantially right angles to the direction of vibration of said acoustic pattern, and maintaining said field during said combustion phase at a strength which provides an attenuative response for the frequency of said sound waves.

4. The subject matter of claim 3, wherein the gas vibration pattern has pressure and velocity antinode regions, and wherein the magnetic field is passed through said pressure antinode region.

5. The subject matter of claim 3, wherein the gas vibration pattern has pressure and velocity antinode regions, and wherein the magnetic field is passed through said velocity antinode region.

6. The method of suppressing detonation of fuel and air mixtures during burning under high compression in the combustion chamber of an internal combustion engine, and wherein gas particles including ions within the combustion chamber tend to vibrate in acoustic patterns, that comprises: setting up in the combustion chamber, laterally across said acoustic patterns, a magnetic field, whereby to set up ion vibration crosswise of said acoustic gas vibration pattern at detonation frequencies, and maintaining said magnetic field during the combustion phase at a strength which substantially laterally deflects said ions in flow paths crosswise of said acoustic patterns at the frequency of said sound waves.

7. In combination with the combustion chamber of an internal combustion engine, wherein burning of fuel and air mixture results in detonation, with accompanying acoustic patterns within the combustion chamber, and wherein particles of the combustion gases are at least partially ionized: means for suppressing such detonation embodying means for establishing in the combustion chamber, in the region of the ionized particles of combustion gas vibrating within said acoustic pattern, a magnetic field of an intensity for the vibration frequency at which said ionized particles respond by material reduction of their vibration amplitude in said acoustic wave pattern.

8. In combination with the combustion chamber of an internal combustion engine, wherein burning of fuel and air mixture results in detonation, with accompanying acoustic patterns within the combustion chamber, said acoustic patterns having pressure and velocity antinodes, and wherein the particles of combustion gases are at least partially ionized: means for suppressing such detonation embodying means for establishing a magnetic field in the combustion chamber through a velocity antinode region of said acoustic pattern and at an intensity which affords an attenuative response for the acoustic pattern at the vibration frequency thereof.

9. In combination with the combustion chamber of an internal combustion engine, wherein burning of fuel and air mixture results in detonation, with accompanying acoustic patterns within the combustion chamber, said acoustic patterns having pressure and velocity antinodes, and wherein the particles of combustion gases are at least partially ionized: means for suppressing such detonation embodying means for establishing a magnetic field in the combustion chamber through the pressure antinode region of said acoustic pattern and at an intensity which affords an attenuative response for the acoustic pattern at the vibration frequency thereof.

10. In combination with the combustion chamber of an internal combustion engine, wherein burning of fuel and air mixture results in detonation, with accompanying acoustic patterns within the gases in the combustion chamber, and wherein the particles of combustion gases are at least partially ionized: means for suppressing such detonation embodying means for subjecting said ionized vibratory gas particles in said acoustic patterns to a magnetic flux of a density to afford a substantially attenuative impedance to ionized gas particle vibration in the frequency range of acoustic gas vibration pattern arising out of detonation.

11. The subject matter of claim 10, wherein the magnetic field is produced in the combustion chamber by an electromagnet positioned adjacent thereto.

12. The subject matter of claim 11, wherein the magnetic field is produced in the combustion chamber by an electrically energized coil surrounding the combustion chamber.

13. The subject matter of claim 11, wherein the magnetic field is produced by a permanent magnet positioned in the region of the combustion chamber so that its field passes therethrough.

14. In combination with the combustion chamber of an internal combustion engine having a cylinder bore communicating therewith and a piston in said cylinder bore, wherein burning of fuel and air mixture results in detonation, with accompanying acoustic patterns within the combustion chamber, and wherein the particles of combustion gases are at least partially ionized: means for suppressing such detonation embodying a permanent magnet mounted on the upper end portion of said piston, in a position to produce a magnetic field through said combustion chamber.

15. In combination with the combustion chamber of an internal combustion engine having a cylinder bore communicating therewith and a piston in said cylinder bore, wherein burning of fuel and air mixture results in detonation, with accompanying acoustic patterns within the combustion chamber, and wherein the particles of combustion gases are at least partially ionized: means for suppressing such detonation embodying a plurality of permanent magnets mounted on the upper end portion of said piston, in a position to produce magnetic fields through said combustion chamber.

References Cited in the file of this patent

UNITED STATES PATENTS

| | | |
|---|---|---|
| 1,474,842 | Misuraca | Nov. 20, 1923 |
| 2,060,263 | Sweeney | Nov. 10, 1936 |
| 2,436,570 | Hancock | Feb. 24, 1948 |
| 2,454,900 | Vang | Nov. 30, 1948 |
| 2,844,135 | Thayer | July 22, 1958 |